US012022284B2

(12) United States Patent
Siryy

(10) Patent No.: US 12,022,284 B2
(45) Date of Patent: Jun. 25, 2024

(54) SYSTEM AND METHODS FOR OVER-THE-AIR SIM PROFILE TRANSFER

(71) Applicant: T-Mobile Innovations LLC, Overland Park, KS (US)

(72) Inventor: Maksym Siryy, Louisburg, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 101 days.

(21) Appl. No.: 17/947,856

(22) Filed: Sep. 19, 2022

(65) Prior Publication Data

US 2023/0017914 A1 Jan. 19, 2023

Related U.S. Application Data

(62) Division of application No. 16/994,210, filed on Aug. 14, 2020, now Pat. No. 11,490,253.

(51) Int. Cl.
| | |
|---|---|
| *H04W 12/06* | (2021.01) |
| *H04L 9/40* | (2022.01) |
| *H04W 4/50* | (2018.01) |
| *H04W 12/08* | (2021.01) |

(52) U.S. Cl.
CPC ......... *H04W 12/06* (2013.01); *H04L 63/0892* (2013.01); *H04W 4/50* (2018.02); *H04W 12/08* (2013.01); *H04L 2209/80* (2013.01)

(58) Field of Classification Search
CPC .... H04W 12/06; H04W 12/08; H04L 63/102; H04L 67/306; H04L 63/0892
See application file for complete search history.

(56) References Cited

U.S. PATENT DOCUMENTS

| | | | |
|---|---|---|---|
| 11,490,253 B1 | 11/2022 | Siryy | |
| 2012/0331545 A1* | 12/2012 | Baliga | H04L 63/0272 726/15 |
| 2013/0157673 A1* | 6/2013 | Brusilovsky | H04W 12/02 455/450 |
| 2014/0143826 A1* | 5/2014 | Sharp | H04L 63/20 726/1 |
| 2018/0317086 A1* | 11/2018 | Ben Henda | H04W 12/062 |

(Continued)

OTHER PUBLICATIONS

Restriction Requirement dated Feb. 16, 2022 U.S. Appl. No. 16/994,210, filed Aug. 14, 2020.

(Continued)

*Primary Examiner* — Dao Q Ho

(57) ABSTRACT

A user equipment and wireless provisioning method and system associated with a first wireless network are provided. The wireless provisioning system includes a processor, a network interface in communication with the first wireless network, and a non-transitory memory storing a first set and a second set of information of a profile related to operation of a UE on a second wireless network. The processor transmits the first set of information to the UE for provisioning to the UE files associated with authorization and authentication of the UE on the second wireless network. The processor validates that the first set of information was provisioned to the UE and transmits the second set of information to the UE for provisioning to the UE pointer updates for updating pointers on the UE to point to the first set of information. The processor transmits an instruction for the UE to reboot.

20 Claims, 13 Drawing Sheets

(56) References Cited

U.S. PATENT DOCUMENTS

2019/0174299 A1* 6/2019 Ullah .................... H04L 63/102
2020/0359212 A1* 11/2020 Chen .................... H04L 63/102
2023/0017914 A1* 1/2023 Siryy ................... H04W 12/40

OTHER PUBLICATIONS

FAIPP Pre-Interview Communication dated Apr. 27, 2022 U.S. Appl. No. 16/994,210, filed Aug. 14, 2020.
Notice of Allowance dated Jul. 6, 2022 U.S. Appl. No. 16/994,210, filed Aug. 14, 2020.

* cited by examiner

300

Script 1
Create Directory File ADF USIM2 (e.g. 7FFA)
      Select ADF USIM2
      Create EF IMSI
      UPDATE BINARY (IMSI value)
      Create EF UST
UPDATE BINARY (UST value)

...
      Create EF EHPLMN
UPDATE BINARY (EHPLMN value)
      Select MF
      Create Directory File ADF ISIM2 (e.g. 7FFB)
      Select ADF ISIM2
      Create EF IMPI
UPDATE BINARY (IMPI value)
      Create EF IST
UPDATE BINARY (IST value)

...
      Create EF GBA
UPDATE BINARY (GBA value)
(that concludes filesystem creation)

INSTALL for LOAD (applet binary1 )
      LOAD BINARY
      ...
LOAD BINARY
(that concludes applet1 binary load)

Script 2 : (script 2 will be sent to SIM only after confirmation of successful execution of Script 1)
Select ADF USIM2
Select EF DIR
UPDATE RECORD 1 (ADF USIM2 name(7FFA)) ; overwrite pointers from ADF USIM1 (Ntwk1) to ADF USIM2(Ntwk2)
UPDATE RECORD 2 (ADF ISIM2 name(7FFB)) ; overwrite pointers from ADF ISIM1 (Ntwk1) to ADF ISIM2(Ntwk2)
UPDATE RECORD 3 (empty filed) ;delete reference to Ntwk1
ADF CSIM
INSTALL for INSTALL (applet 1 )
INSTALL for INSTALL (applet 2)
INSTALL for INSTALL (applet 3 )

FIG. 3B

SYSTEM AND METHODS FOR OVER-THE-AIR SIM PROFILE TRANSFER

CROSS-REFERENCE TO RELATED APPLICATIONS

This application is a divisional of and claims priority under 35 U.S.C. § 120 to U.S. patent application Ser. No. 16/994,210, filed on Aug. 14, 2020, entitled "System and Methods for Over-the-Air SIM Profile Transfer," by Maksym Siryy, which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices or user equipment (UEs) may have subscriber identity module (SIM) cards. The SIM card is stored on a universal integrated circuit card (UICC), which may be removed from the UE. The SIM card includes credentials, such as confidential keys and encryption keys that are retrieved by the UE's radio modem and used by the radio access network (RAN) to establish a wireless link with a cell site. The SIM card may also include branding information related to the network operator associated with the UE. SIM cards may vary depending on the type of network in which the UE operates—SIMs operate in Global System for Mobile communications (GSM) networks, code-division multiple access (CDMA) SIMs (CSIM) operate on CDMA networks, and universal SIMs (USIM) operate in GSM as well as in other networks, such as universal mobile telephone service (UMTS). More current devices have an embedded SIM card (eSIM) that provides the functions formerly provided by removable SIM cards. An eSIM is embedded on the motherboard of the UE instead of being removable as in the case of legacy SIM cards.

SUMMARY

In an embodiment, a wireless provisioning system associated with a first wireless network is provided. The wireless provisioning system includes a processor, a network interface in communication with the first wireless network, and a non-transitory memory storing a first set and a second set of information of a profile related to operation of a UE on a second wireless network. Instructions are stored in the non-transitory memory that when executed by the processor transmit, to the UE via the network interface, the first set of information for provisioning to the UE issuer security domain and application dedicated files associated with authorization and authentication of the UE on the second wireless network. The instructions further cause the processor to validate that the first set of information was provisioned to the UE, and after validation of the first set of information, transmit, to the UE via the network interface, the second set of information for provisioning to the UE pointer updates for updating pointers on the UE to point to the first set of information. The instructions further cause the processor to transmit, to the UE via the network interface, an instruction for the UE to reboot.

In another embodiment, a method for wireless provisioning is provided that includes transmitting, to a UE configured for operation on a first network via a network interface in communication with the first wireless network, a first set of information of a profile related to operation of the UE on a second wireless network, the first set of information for provisioning to the UE issuer security domain and application dedicated files associated with authorization and authentication of the UE on the second wireless network. The method includes validating that the first set of information was provisioned to the UE, and after validation of the first set of information, transmitting, to the UE via the network interface, a second set of information of the profile for provisioning to the UE pointer updates for updating pointers on the UE to point to the first set of information. The method further includes transmitting, to the UE via the network interface, an instruction for the UE to reboot.

In yet another embodiment, a UE configured for operation on a first wireless network is provided. The UE includes a processor and a SIM card provisioned with a first profile for operation by the UE on the first wireless network, the first profile including pointers pointing to files that authorize and authenticate the UE on the first wireless network. The UE further includes a wireless transceiver configured to receive a second profile related to operation of the UE on a second wireless network, the second profile provisioned to the SIM card of the UE. The second profile including new issuer security domain and application dedicated files added to the existing issuer security domain and file structure on the SIM card. Provisioning the second profile changes the pointers in the first profile to point to files in the second profile that authorize and authenticate the UE on the second wireless network. Upon reboot the UE instantiates, via the pointers, the second profile to enable the UE to operate on the second wireless network. Other than the changed pointers, the files and directories comprising the first profile remain substantially unchanged stored on the SIM card after provisioning the second profile to the SIM card of the UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 3A and 3B are exemplary scripts for provisioning a SIM card for operation on the second network according to an embodiment of the disclosure.

DETAILED DESCRIPTION

Figure 1:
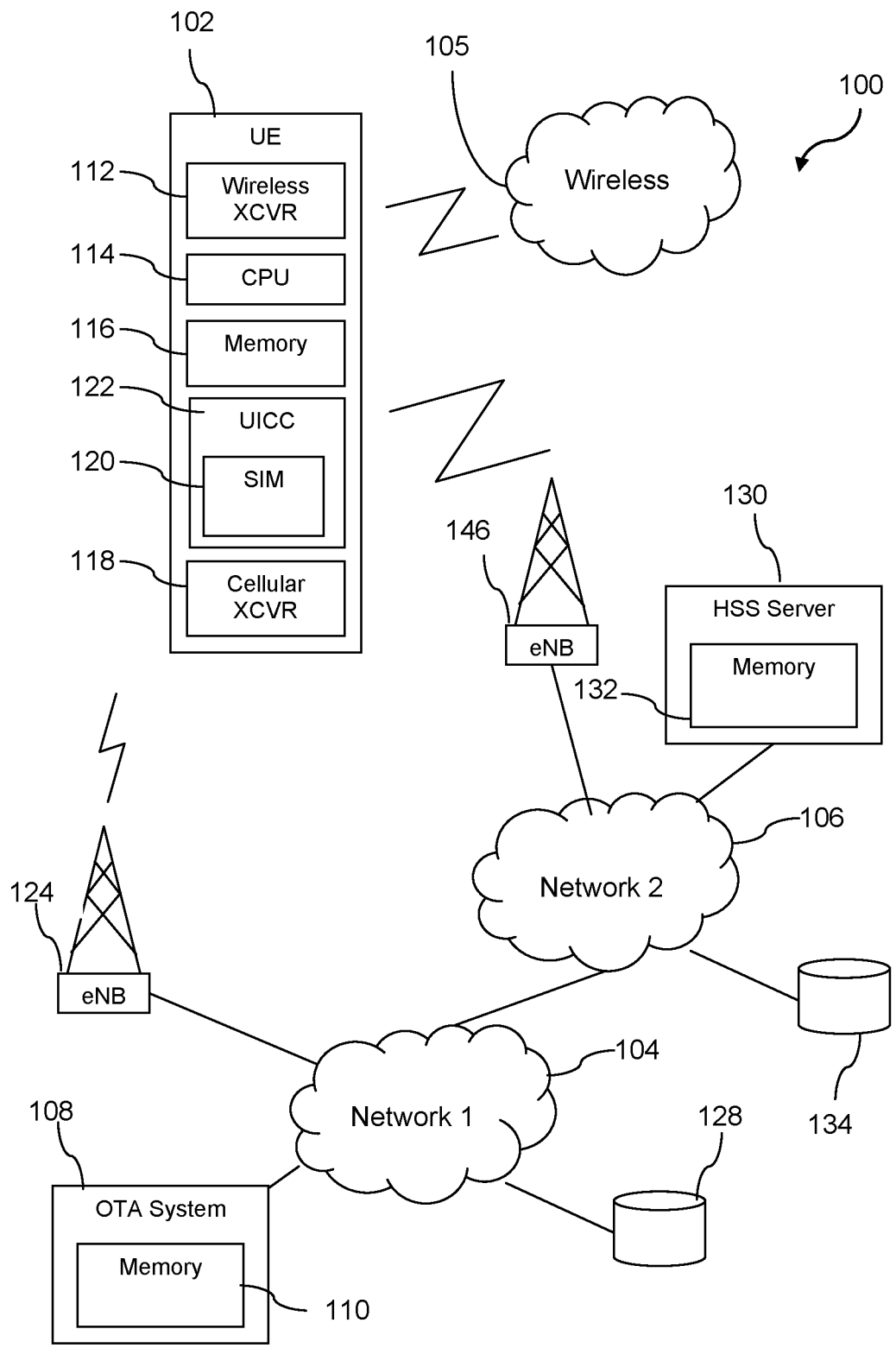
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It may be desirable for customers or users of UEs of one network operator to reconfigure the UEs to operate on the network of another network operator, such as when customers switch operators, when network operators join or merge their respective operations, or for other reasons. Replacing the customer's UE with a new UE that operates on the new network is a costly solution. Replacing the UE's SIM card with a new SIM card for operation on the new network is also costly and inconvenient for the customer. The more cost effective solution is for the customer's existing UE to be re-configured to operate on the new network. To facilitate this transition, the SIM card on the UE may be wirelessly provisioned for operation on the new network.

The present disclosure proposes leveraging existing over-the-air (OTA) SIM/UICC profile updating platforms of the first network to provision the UE's SIM card with the relevant files and applications to operate in the new, second network. The solution is generally carried out in two steps. The first step builds the files used for operation on the second network, such as profile artifacts, directories, associated files, applet binaries, and authentication key, and loads them onto the SIM card of the subject UE. However, the SIM card of UEs being re-provisioned needs sufficient free storage space to accommodate the files to support operation on the new network, while still maintaining the files to support current operation on the first network. The new profile data is provisioned on the SIM using the file creation capability of the OTA platform of the current, first network and is performed by executing one or more scripts.

The second step involves overwriting pointer values of the SIM card to cause the SIM card functions to refer not to the profile for the first network but instead to the newly added profile data of the new, second network. The appropriate applets would be instantiated and the UE will be reset or rebooted, causing the device to take cognizance of the changed SIM card values and connect to the second network.

The outcome of the first step can be validated before progressing to the second step. If any of the directories, files, applications were not properly created or loaded in the first step, the second step can be delayed until the first step completes successfully. As such, any observable problem of operating the UE can be avoided. The first step is the most extensive and involves creating and loading the new profile data, while the second step includes very few operations, hence the likelihood of an error occurring is much more likely in the first step, which can be easily resolved thus minimizing the likelihood of serious errors that would interfere with the operation of the UE. The second step can also be validated before reboot to ensure the pointer values were correctly updated. In the event errors are identified that cannot be immediately corrected, the pointers can be switched back to point to the old profile and the UE can continue uninterrupted operation on the first network. Once the errors are corrected, the pointers can be returned to point to new profile for subsequent operation on the new, second network. However, even after the switch to the new profile and second network, it may be advantageous for the old profile to remain on the SIM card to facilitate a return to the first network if desired. For example, in locations where the wireless coverage for the second network is inadequate but wireless coverage is available on the first network, it may be useful to switch back to the old profile to operate on the first network. This may be accomplished by, for example, returning the pointers on the SIM card to point back to the appropriate files of the first profile and rebooting the UE to instantiate the old profile and enable operation on the first network.

As can be seen, the present disclosure teaches a technical solution to a technical problem. That is, the present disclosure provides a computer or information technology (IT) based solution of provisioning existing SIM cards with a second profile using existing OTA infrastructure to enable existing, perhaps legacy UEs to switch operation to a second network which addresses a problem inherently rooted in computers and/or in IT technology.

The present disclosure is distinct from the more traditional methods of physically replacing the UE's SIM card, methods used for multiple profile eSIMs or earlier Chameleon type SIM profiles. The present disclosure incudes multiple stages with the new information stored in a previously unused space on the SIM card (rather than overwriting the primary profile on the SIM card with the new profile) and then implementing a pointer shift and bootstrap or other mechanism to drive the shift to the new profile and connection to the new network.

Turning now to FIG. 1, a system 100 is described. In an embodiment, system 100 comprises a mobile communication device or UE 102, a first network 104, which may be a first telecommunications network operated by a first network operator, and a second network 106, which may be a second telecommunications network operated by a second network operator. The UE 102 is one of a mobile phone, a smart phone, a personal digital assistant (PDA), a wearable computer, a headset computer, a media player, a laptop computer, a notebook computer, or a tablet computer. Computer systems are described further hereinafter.

The UE 102 may comprise one or more wireless radio transceivers 112 for connection via WiFi to another wireless network 105, such as a local area network for connection to the Internet, or connections via Bluetooth to other Bluetooth enabled devices. The UE 102 includes a processor 114, and a memory 116. The memory 116 may comprise a non-transitory portion as well as a transitory portion. The UE 102 further comprises a cellular radio transceiver 118.

The UE 102 also includes a SIM card 120 installed on a UICC 122. In this embodiment, the UICC 122 includes storage in excess of 64 kilobytes (kb), such as but not limited to 192 kb, 256 kb or more storage capacity. Further, the UICC 122/SIM card 120 may be removable. In an embodiment, the SIM card 120 (e.g., a non-removable SIM card or a removable SIM card) has one of greater than 64 kb memory, 192 kb of memory or greater, or 256 kb of memory or greater, and wherein the second profile is stored on previously unused and undesignated space on the SIM card. As discussed above, data stored on the SIM card 120 include credentials, such as confidential and encryption keys, that are retrieved by the cellular transceiver 118 and used by the first network 104 to establish a wireless link with a cell site 124 of the first network 104. The cell site 124 may provide a wireless communication link to the cellular radio transceiver 118 according to various wireless protocols such as 5G, long term evolution (LTE), CDMA, or GSM. After authenticating the UE 102, the first network 104 authorizes communication with the UE 102.

The first network 104 may also include an over-the-air (OTA) provisioning system 108 for initial or ongoing configuration, distribution of new software, or other provisioning of the UE 102. The OTA provisioning system 108 in this embodiment supports bearer independent protocol (BIP) for communications between the SIM card 120 of the UE 102 and the first network 104. BIP provides advantages over other OTA systems that instead use short message service (SMS) for provisioning because BIP can handle larger file loading during provisioning and provides other flexibility, such as directory and file creation, not easily or able to be accomplished with/by non-BIP OTA systems. The OTA provisioning system 108 also includes memory 110 for storing data and instructions for provisioning the UE 102. Similar and additional information to support UE 102 may also be stored in one or more databases 128 of the first network 104.

Similar to the first network 104, the second network 106 includes a cell site 146 that may provide a wireless communication link to devices, such as the UE 102, according to various wireless protocols such as 5G, LTE, CDMA, GSM, and others. The second network 106 also includes a home subscriber server (HSS) 130 that contains identification and addressing information, such as the International Mobile Subscriber Identity (IMSI), Mobile Subscriber ISDN number (MSISDN), user profile information, as well as security and other information to enable devices, such as the UE 102, to access the second network 106. The identifying and addressing information retained on the HSS 130 may be referred to herein as subscriber information. The HSS 130 also includes memory 132 where such information may be stored. Such information, as well as other information used to support operation of UEs on the second network 106, may also be stored in one or more databases 134 of the second network 106.

While only the first network 104 is shown having the OTA provisioning system 108, it is anticipated that the second network 106 would include such systems and capabilities as well. Similarly, while only the second network 106 is shown having the HSS server 130, it is anticipated that the first network 104 would include such systems and capabilities also. Thus for sake of brevity, FIG. 1 illustrates only some of the components which comprise first and second networks 104 and 106, and other systems and components that support and comprise such telecommunication networks may also exist as would be readily understood by one skilled in the art.

Figure 2A:
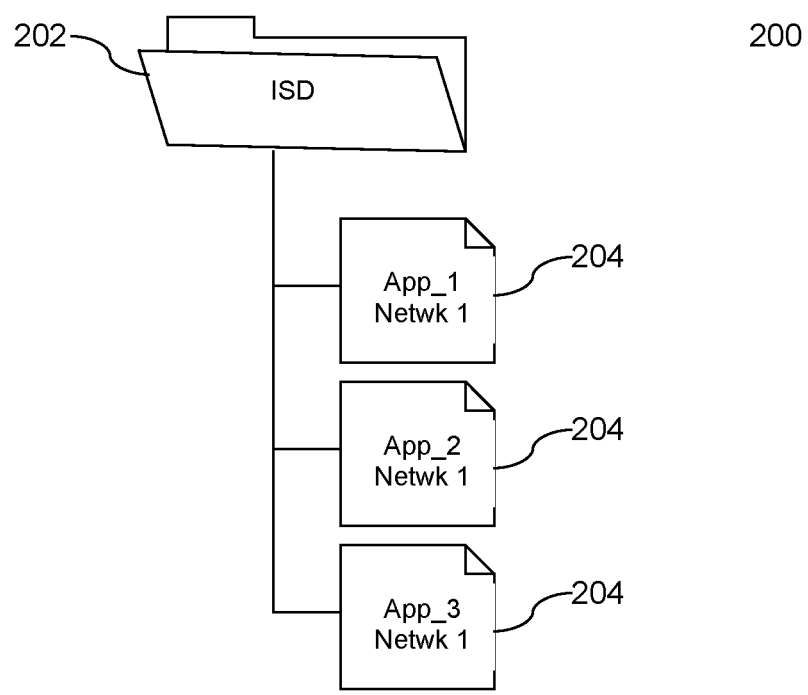
FIGS. 2A and 2B are illustrations of a security domain and file system structure of a SIM card configured for operation on a first network according to an embodiment of the disclosure.

Referring to FIG. 2A, in this embodiment the SIM card 120 is illustrated as having been previously provisioned for operation on the first network 104 with data stored in an initial state on the UICC 122. The SIM card 120 includes a security domain (SD) 200 and applet structures that are stored on a protected area of the SIM card 120. The SD 200 includes an issuer security domain (ISD) 202 that is used for the management of applications on the SIM card 120 issued by the mobile network operator, in this case the operator of the first network 104. The ISD 202 includes, among other information, security keys, encryption and encryption applications, and so on that are used with the international mobile subscriber identity module (IMSI) that uniquely identifies the UE 102 to authenticate the UE 102 on the first network 104. The SD 200 also includes applications 204, such as JAVA applet binaries, that when executed are used for authorization and authentication functions.

Figure 2B:
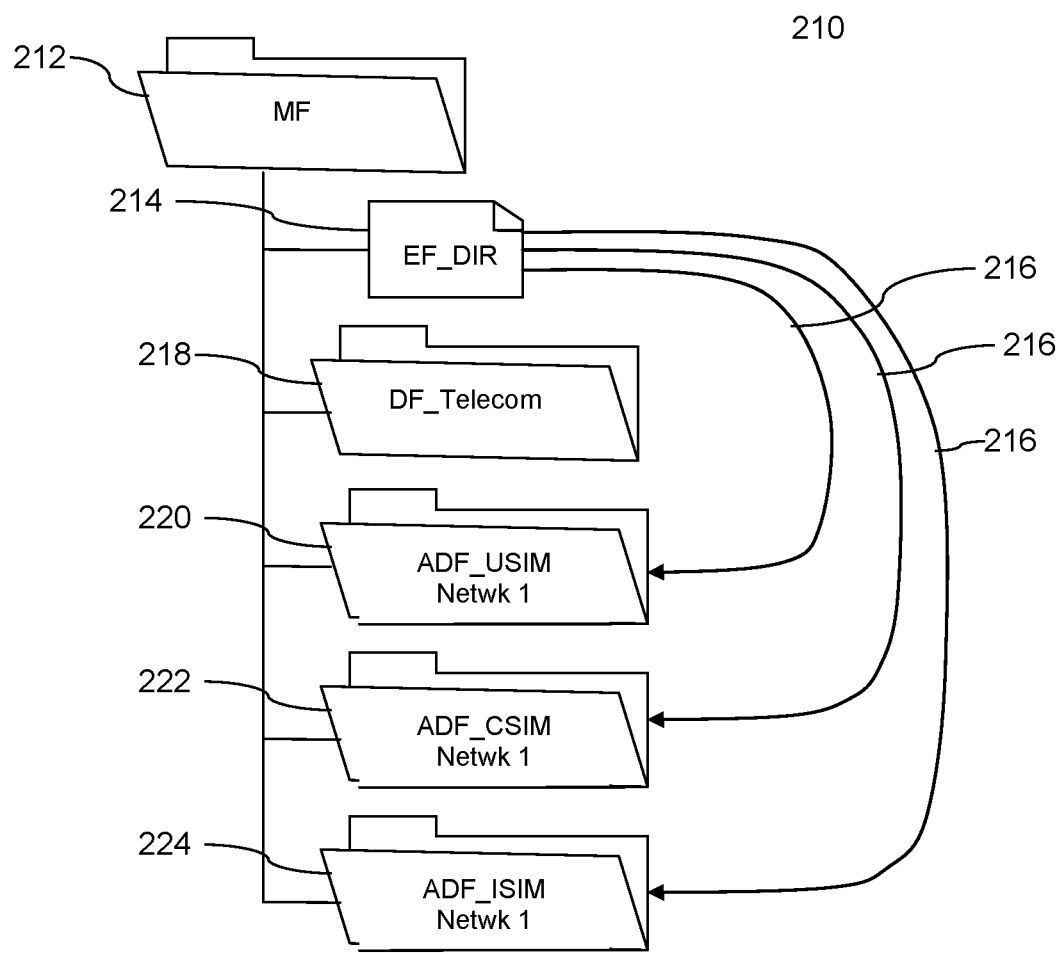

Referring to FIG. 2B, the SIM card 120 also includes a file system structure 210 having a master file (MF) 212. The MF 212 is the root or top-level directory of the dedicated files (DF) and elementary files (EF) on the SIM card 120. EF_DIR 214 is the elementary file directory and contains, among other information, the elementary files and pointers 216 pointing to the relevant files to be executed by the SIM card 120. DF_Telecom 218 includes the dedicated files with relevant service information about the operator of the mobile network, which in this case is the first network 104. ADF_USIM 220 contains the application dedicated files (ADFs) related to applications for the UE 102 to operate on GSM and other networks, such as UMTS. ADF_CSIM 222 contains the ADFs for the UE 102 to operate on CDMA networks. ADF_ISIM 224 contains ADFs for the UE 102 to operate on Internet Protocol Multimedia Service systems. The SIM card 120 may contain addition files and information as would be understood by one of ordinary skill. All the information on the SIM card 120 necessary for operation of the UE 102 on the first network 104 is collectively referred to as a profile, profile information, or the SIM profile.

On startup of the UE 102, the operating system of the SIM card 120 uses MF 212 to enable the UE 102 to identify, via DF_Telecom 218, the network operator information of the UE 102, which in this example is the first network 104, while the pointers 216 of the EF_DIR 214 point to the relevant ADFs and the associated files for operability on the appropriate networks, such as GSM, UMTS, CDMA, and IMS networks.

As discussed above, it may be desirable to provision the UE 102 for operation on the second network 106, for example, in cases where the user desires to switch network operators or network operators merge their respective network operations. The present disclosure provides techniques to enable the UE 102 to switch from operating on the first network 104 to operating on the second network 106.

Figure 2C:
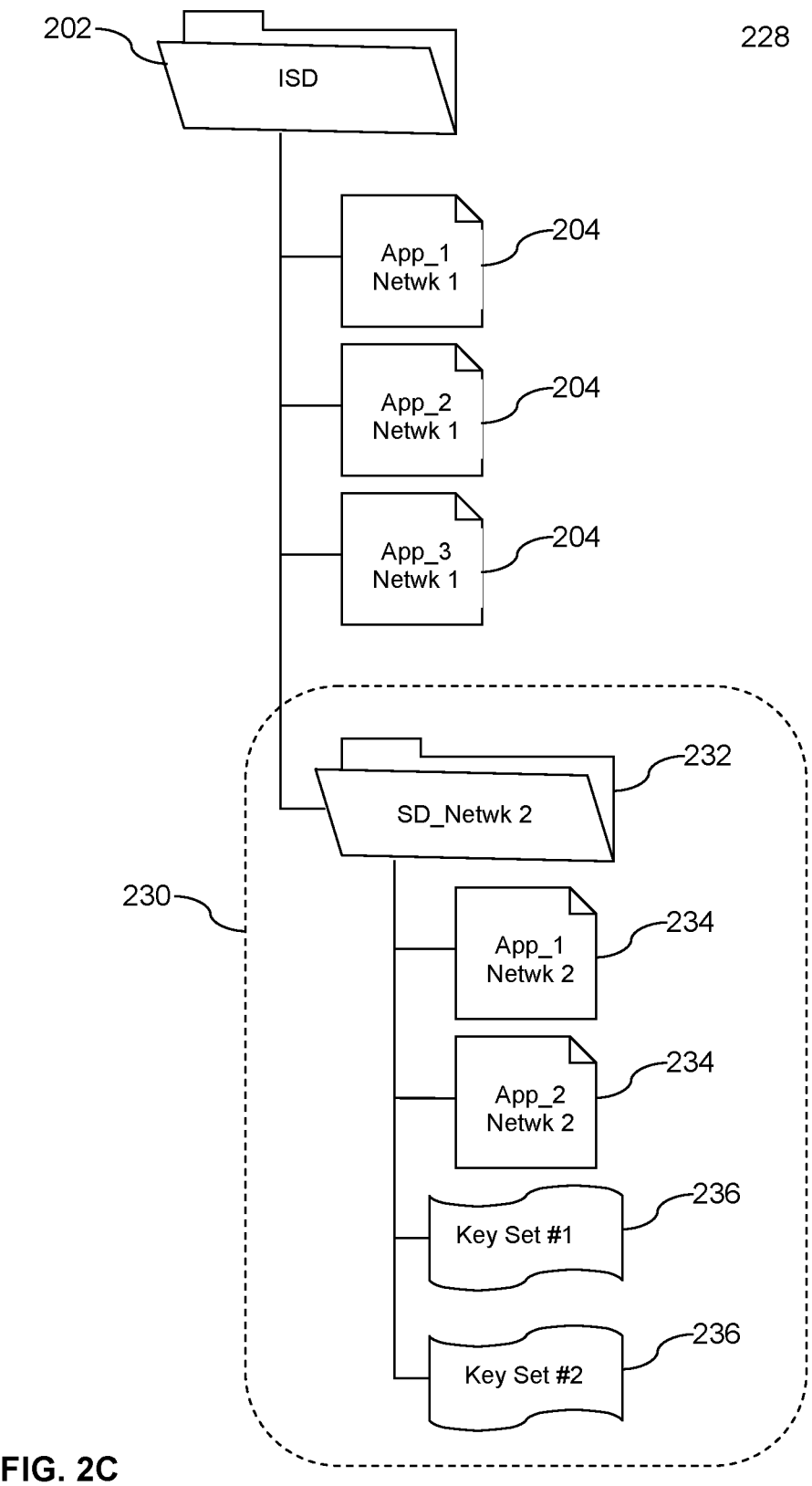
FIGS. 2C and 2D are illustrations of a modified security domain and file system structure of the SIM card according to an embodiment of the disclosure.
Figure 2D:
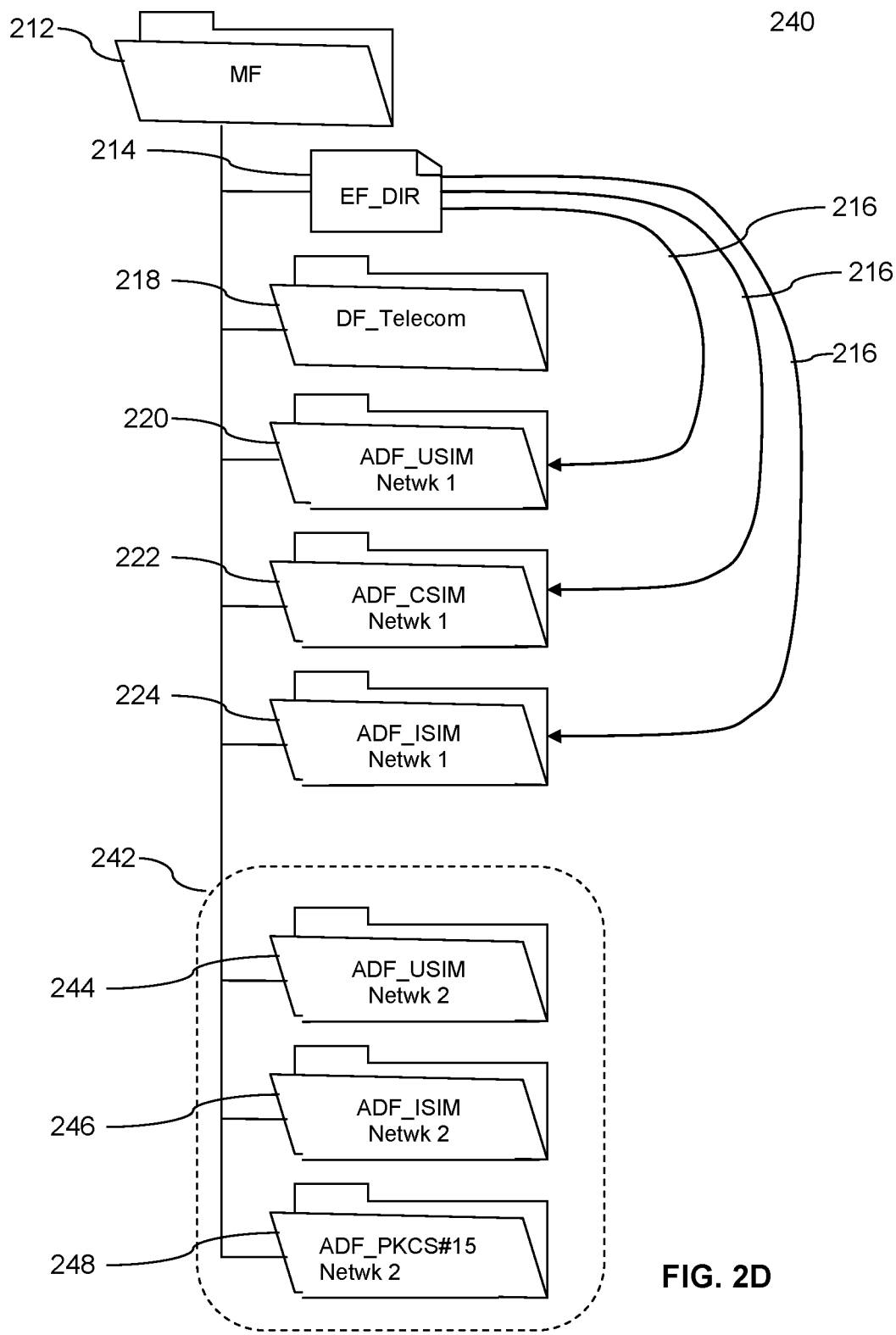

In this embodiment, as illustrated in FIGS. 2C and 2D, the present disclosure provides for provisioning the SIM card 120 of the UE 102 with profile information including directories, files, and applications necessary for operation on the second network 106. As discussed above, the process is generally carried out in two steps.

The first step builds the files necessary for operation on the second network 106, such as profile artifacts, directories, associated files, applet binaries, and authentication key, and loads them onto the SIM card 120 of the UE 102. The new profile data is then provisioned on the SIM card 120. The second step involves overwriting pointer values of the SIM card 120 to cause the SIM card 120 to refer not to the profile for the first network 104 but instead to the newly added profile data of the second network 106. The appropriate applets would be instantiated and the UE 102 is then reset, causing the device to take cognizance of the changed SIM values and connect to the second network 106.

In the first step, the OTA provisioning system 108 on the first network 104 creates the corresponding profile information for the UE 102 to operate on the second network 106 and stores the profile information in various files, for example, in the memory 110 of the OTA provisioning system 108. The files include the security domain files such as security keys, encryption and encryption applications, and so on that will be used to authenticate the UE 102 on the first network 106. These files also include the information related to the operator of the second network 106 and the corresponding DFs, EFs and ADFs that will be used for operation on the various types of telecommunication networks, such as GSM, CDMA, UMTS, LTE, and so on.

Once all the new SIM profile information has been created and stored, the OTA provisioning system 108 provisions the SIM card 120 with the new profile information. As discussed above, the OTA provisioning system 108 in the present embodiment utilizes BIP which enables more robust provisioning than other OTA systems that utilize SMS. BIP allows the OTA provisioning system 108 to not only create directories on the SIM card 120, but allows for file creation and heavy loading of more and larger files on the SIM card 120 which is desirable for implementation of the present disclosure. In one embodiment, the OTA provisioning system 108 wirelessly communicates with UE 102 via cell site 124, while in other embodiments the OTA provisioning system 108 wirelessly communicates with UE 102 wirelessly over the internet via wireless network 105.

FIG. 2C illustrates a modified security domain 228 of the SIM card 120. The OTA provisioning system 108 utilizes the above BIP capabilities and the excess storage space on the SIM card 120 to create a new ISD 230 on the SIM card 120. As discussed above in this embodiment, the SIM card 120 has memory in excess of 64 kb which allows for storage of the new profile information for support on the second network 106 without the need for overwriting the existing SIM profile. As part of the provisioning, the OTA provisioning system 108 creates a top level security domain (SD) 232 directory and any other associated or desired directories. The OTA provisioning system 108 then provisions the new ISD 230 with encryption applications 234, such as applet binaries, security keys 236, and so on that are useful to authenticate the UE 102 on the second network 106. The applications 234 may be JAVA applet binaries that when executed perform the actual authorization and authentication functions.

FIG. 2D illustrates a modified file system structure 240 including new ADFs 242 to support operation on the second network 106. In this embodiment, the new ADFs 242 includes a new ADF_USIM 244 that contains the ADFs related to applications for the UE 102 to operate on GSM and other networks, such as UMTS. The new ADFs 242 includes a new ADF_ISIM 246 that contains ADFs for the UE 102 to operate on Internet Protocol Multimedia Service systems. The new ADFs 242 also includes ADF_PKCS #15 248 that contains ADFs for the UE 102 to support Public Key Cryptographic Standards (PKCS) tokens including the file structures, encoding, and so on.

The practical manner in which the new ADFs 242 and new IDS 230 directories and files are created on the SIM card 120 would be well understood by one of ordinary skill and will not be discussed for sake of brevity. It will be appreciated that the above process of creating the new profile information including the new IDS 230 and the new ADFs 242 may occur in a different order than discussed above, such as creation of the directories in both domains before populating content into the relevant directories, or may happen substantially simultaneously, or other orders as would be appreciated by one skilled in the art. Once the heavy loading of the profile information is completed, the entire process and all profile information can be validated to ensure that all steps were properly and completely executed and that all the profile information was properly created and provisioned to the SIM card 120. Any steps or profile information that fails the validation process can be repeated until all the profile information is correctly provisioned to the SIM card 120.

Before the UE 102 attempts to connect to the second network 106, the second network may be made aware that the UE 102 will be switching to operate on the second network 106. Among other preparations that may be made, the HSS 130 of the second network 106 may be updated with the necessary subscription information regarding the UE 102, such as identification and addressing information including IMSI, MSISDN, user profile information, as well as security and other information to enable the second network 106 to authorize and authenticate UE 102. This information may be stored in the memory 132 of the HSS 130 or elsewhere. The process of updating the HSS 130 with the UE 102 subscription information may be accomplished at any time before execution of the second step and final step, discussed below, of provisioning the SIM card 120 for operation on the second network 106, so that the HSS 130 can identify the UE 102 once it attempts to connect to the second network 106. The above validation process may include verifying that the relevant subscription information for the UE 102 is present and correctly stored on the HSS 130 or it may be validated at other times.

Figure 2E:
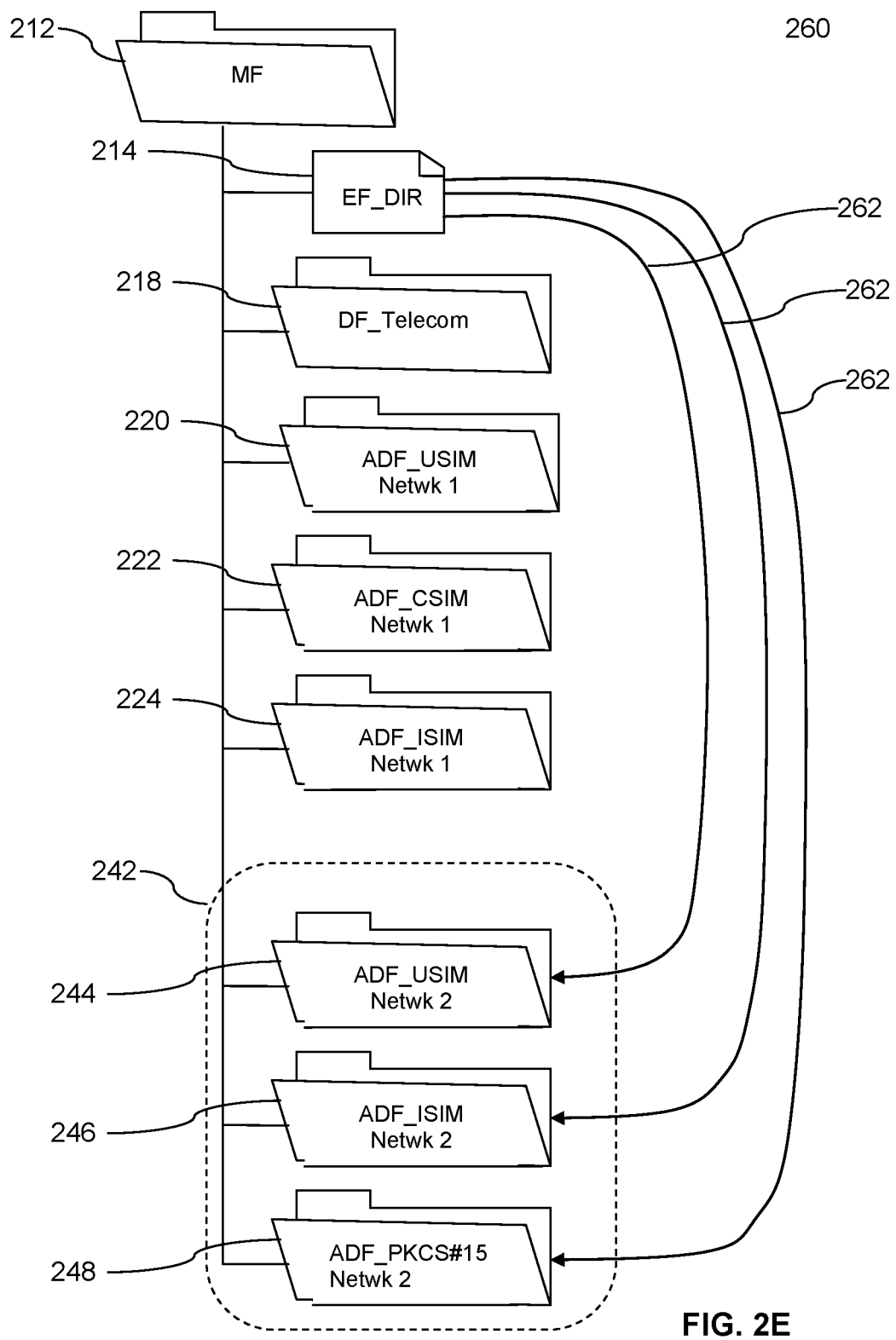
FIG. 2E is an illustration of a final security domain and file system structure of the SIM card configured for operation on a second network according to an embodiment of the disclosure.

The second step of provisioning the SIM card 120 and UE 102 for operation on the second network is illustrated in FIG. 2E which shows a final file structure 260 of the SIM card 120. In the second step, the OTA provisioning system 108 replaces or updates EF_DIR 214 such that the pointers 262, which previously pointed to the ADFs for operation on the first network 104 (ADF_USIM 220, ADF_CSIM 222, ADF_ISIM 224), now point to the new ADFs 242 (ADF_USIM 244, ADF_ISIM 246, ADF_PKCS #15) provisioned to support the second network 106. Once the EF-DIR 214 has been updated with the new pointers 262, the UE 102 can be rebooted or restarted. After rebooting or bootstrapping the UE 102, the operating system of the SIM card 120 uses the pointers 262 in the EF_DIR 214 which point to the relevant additional ADFs 242 and the associated files which now utilize the new ISD 230 security files which were previously provisioned on the SIM card 120 for authorization and authentication on the second network 106. Since the HSS 130 was previously updated with the subscription information of the UE 102, the second network 106 authenticates and authorizes the UE 102 to operate on the second network 106.

The above steps are distinct from prior techniques for provisioning a new profile that employ a simple switch to a fully prepopulated and preprogrammed alternate profile or slot on the SIM card. Instead, the present disclosure uses two stages or steps for loading and validating, employing a pointer shift to the new profile loaded in previously unused, undesignated space on the SIM card 120.

Except as described above, the old profile (directories, files, applet binaries, and so on) that were used to support the first network 104 remain substantially intact and stored on the SIM card 120. This data can remain on the SIM card 120 or be removed at a later date if desired. In this embodiment, the new profile including the new ADFs 242, new IDS 230 directories, and so on are provisioned to previously unused space on SIM card 120, which contrasts with provisioning of prior multi-profile eSIMs where the new profile is stored in space for which the card was specifically designed and previously designated for the new profile.

It may be advantageous for the old profile to remain on the SIM card 120 to facilitate rapid return to operation on the first network 104 if desired. For example, in locations where the wireless coverage for the second network 106 is inadequate but wireless coverage is available on the first network 104, it may be useful to switch back to the old profile to operate on the first network 104. This may be accomplished by, for example, returning the pointers on the SIM card 120 to point back to the appropriate files of the first profile and rebooting the UE 102 to instantiate the old profile and enable operation on the first network 104.

The OTA provisioning system 108 can validate the process of updating or replacing the EF_DIR 214 with the new pointers 262 before the UE 102 is rebooted to verify the process was properly executed and that the new pointers 262 are correct. The process can be repeated to correct any errors identified during validation before the UE 102 is rebooted to reduce the likelihood of encountering any errors on reboot. For purposes herein, the term rebooting may be used to refer to operations that re-initialize the SIM card 120, such as booting, bootstrapping, restarting, initiating, and so.

The above steps for provisioning the SIM card 120 for operation on the second network 106 may be carried out in various manners including using scripts. FIGS. 3A and 3B include exemplary scripts, where FIG. 3A provides a first script 300 for accomplishing the provisioning discussed with regard to FIGS. 2C and 2D in step one, and FIG. 3B provides a second script 302 for accomplishing the provisioning discussed with regard to FIG. 2E in step two. It will be appreciated that the first and second scripts 300 and 302 for implementing the present disclosure are exemplary and other programming, scripts with varying steps in different orders may be utilized, all of which are within the spirt and scope of the present disclosure.

FIGS. 3A and 3B further illustrate that the majority of the process for provisioning the UE 102 for operation on the second network 106 are accomplished by the first step executed by the first script 300. As such, most errors are likely to occur during execution of script 300. However, none of the provisioning during the first step executed by the first script 300 interferes in any way with the continuing operation of the UE 102 on the first network 104. Once the first script 300 is completed, a validation process verifies that all the directories, file creations, loading, and so on executed by the first script 300 were successful. If any errors are identified by the validation process, the relevant processes can be re-executed until they are successful. Once all the provisioning by the first script 300 is validated, the second step may be processed by the second script 302.

In the event an error occurs during the second step and before rebooting the UE 102, the pointers 262 in EF-DIR 214 can be redirected back to the pointers 216 to point to the ADFs of the initial, first profile to enable the UE 102 to continue operating on the first network 104 until further updates or corrections can be made to complete the transition to the second profile and second network 106.

The provisioning during the first step may be undertaken at any time, such as days or months before the final provisioning is accomplished in the second step. Where many UEs may need to be provisioned, the first step may be accomplished in batches well in advance of any planned switch to the second network 106. Similarly, the HSS 103 may be batch loaded with the subscription information of the UEs at any time in advance of the switch-over.

Figure 4:
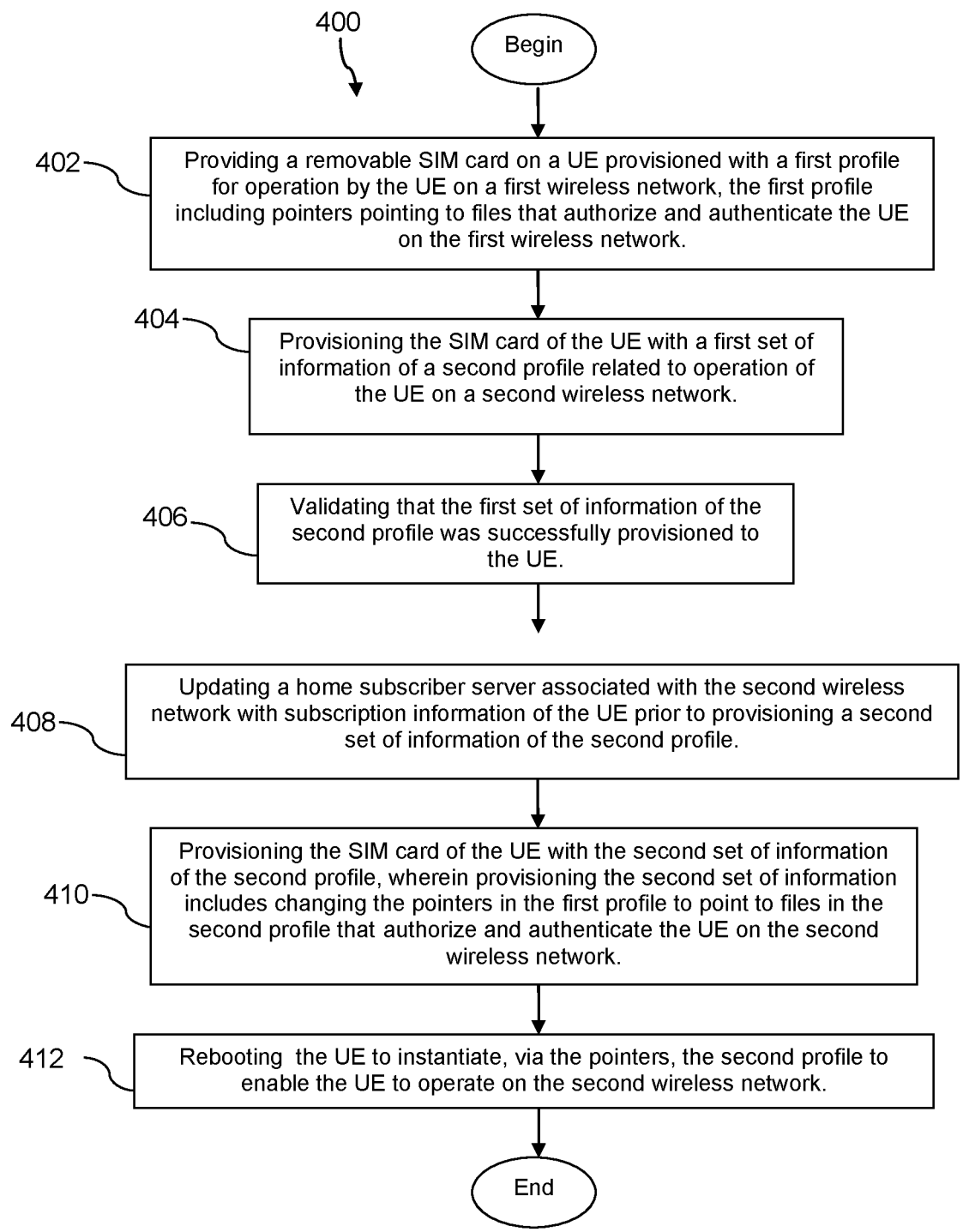
FIG. 4 is a flow chart of a method for over-the-air provisioning of a SIM card for operation on a second network according to an embodiment of the disclosure.

FIG. 4 is flow chart illustrating a method 400 for provisioning user equipment, such as UE 102, that is initially configured for operation on a first wireless network, such as the first network 104, for operation on a second wireless network, such as the second network 106. The method begins at block 402 by providing a removable SIM card, such as SIM card 120, on the UE. The UE is provisioned with a first profile for operation by the UE on the first wireless network, the first profile including pointers, such as pointers 216, pointing to files that authorize and authenticate the UE on the first wireless network. As discussed above, these files include the issuer security domain 202, the file system structure 210 having the master file and DF and EF files used for the UE 102 to operate on the first wireless network.

At block 404, method includes provisioning the SIM card of the UE with a first set of information of a second profile related to operation of the UE on a second wireless network. This step would include provisioning via an OTA system, such as OTA provisioning system 108 that uses BIP as discussed above. The first set of information of the second profile includes the issuer security domain, such as the new ISD 230, and application dedicated files, such as the new ADFs 242, for authorization and authentication of the UE on the second wireless network.

At block 406, the method includes validating that the first set of information was successfully provisioned to the UE. At block 406, all the directories, security keys, applet binaries, and so on provisioned to the UE at block 404 are checked to verify all the data was correctly provisioned to the SIM card. If the validation identifies any errors, this step would include re-executing the relevant scripts or portions until the validation process confirms the data was successfully provisioned to the UE.

At block 408, the method includes updating a home subscriber server, such as HSS 130, associated with the second wireless network with subscription information of the UE prior to provisioning a second set of information of the second profile. Further, as discussed above, prior to the final provisioning and switch-over to the second network, the HSS should be checked to ensure it has the correct subscription information for the UE. This may be accomplished during the validation process at block 406 or at a separate time.

At block 410, the method includes provisioning the SIM card of the UE with the second set of information of the second profile, wherein provisioning the second set of information includes changing the pointers in the first profile to point to files in the second profile, such as changing the pointers in EF_DIR 214 to pointers 262, that authorize and authenticate the UE on the second wireless network. The provisioning at block 410 can include further validation to ensure the changes made to the SIM card at this step are executed properly and that the pointers 262 point to the correct new ADFs 242 of the second network 106. It can be seen that, at this point in the provisioning process, the UE is fully provisioned for operation on the second network, while still able to operate on the first network. So any errors that occurred during the provisioning steps can still be rectified before the switch over, which is accomplished at the final, next step.

At block 412 the method includes rebooting the UE to instantiate, via the pointers, the second profile to enable the UE to operate on the second wireless network. Once the UE reboots, the operating system on the SIM looks to EF_DIR 214 for the pointers to the appropriate ADFs. Since new pointers 262 in the EF_DIR 214 now point to the new ADFs 242, the SIM card 120 and UE 102 can now operate on the second network 106. The provisioning method then ends.

Figure 5:
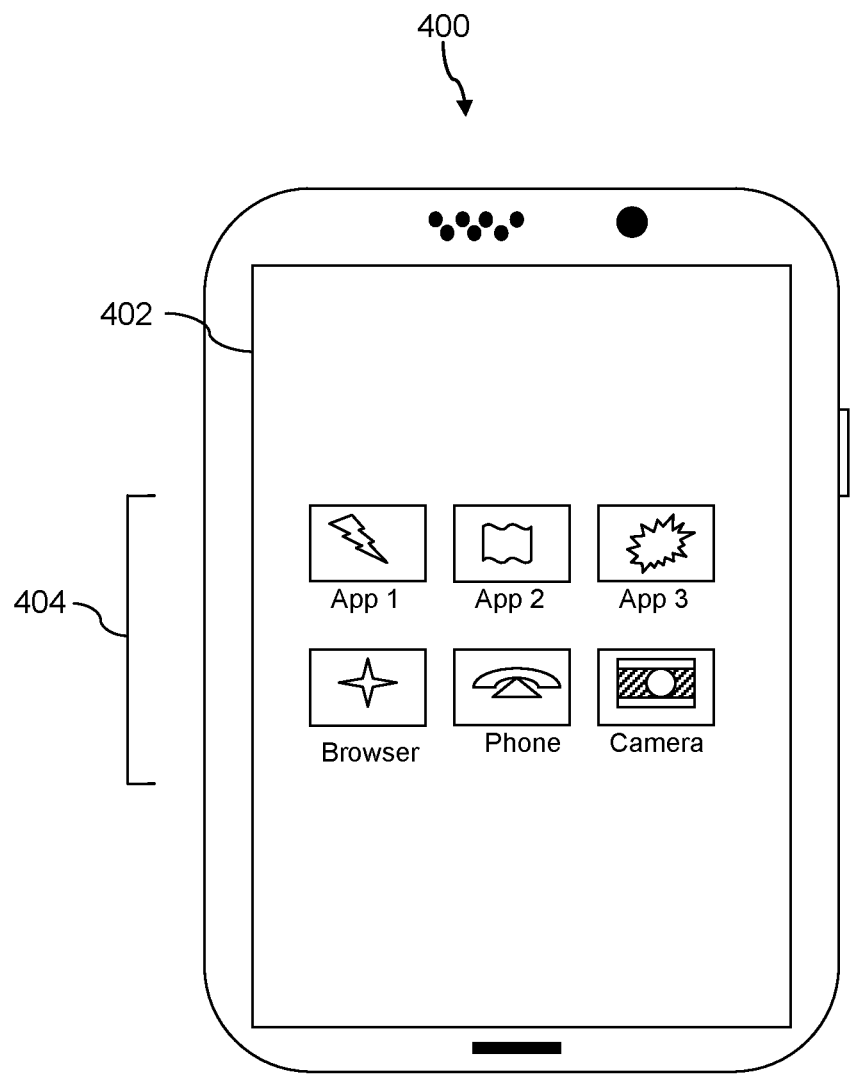
FIG. 5 is an illustration of a mobile communication device according to an embodiment of the disclosure.

FIG. 5 depicts another embodiment of UE 102, illustrated here as UE 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured OTA as discussed above, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
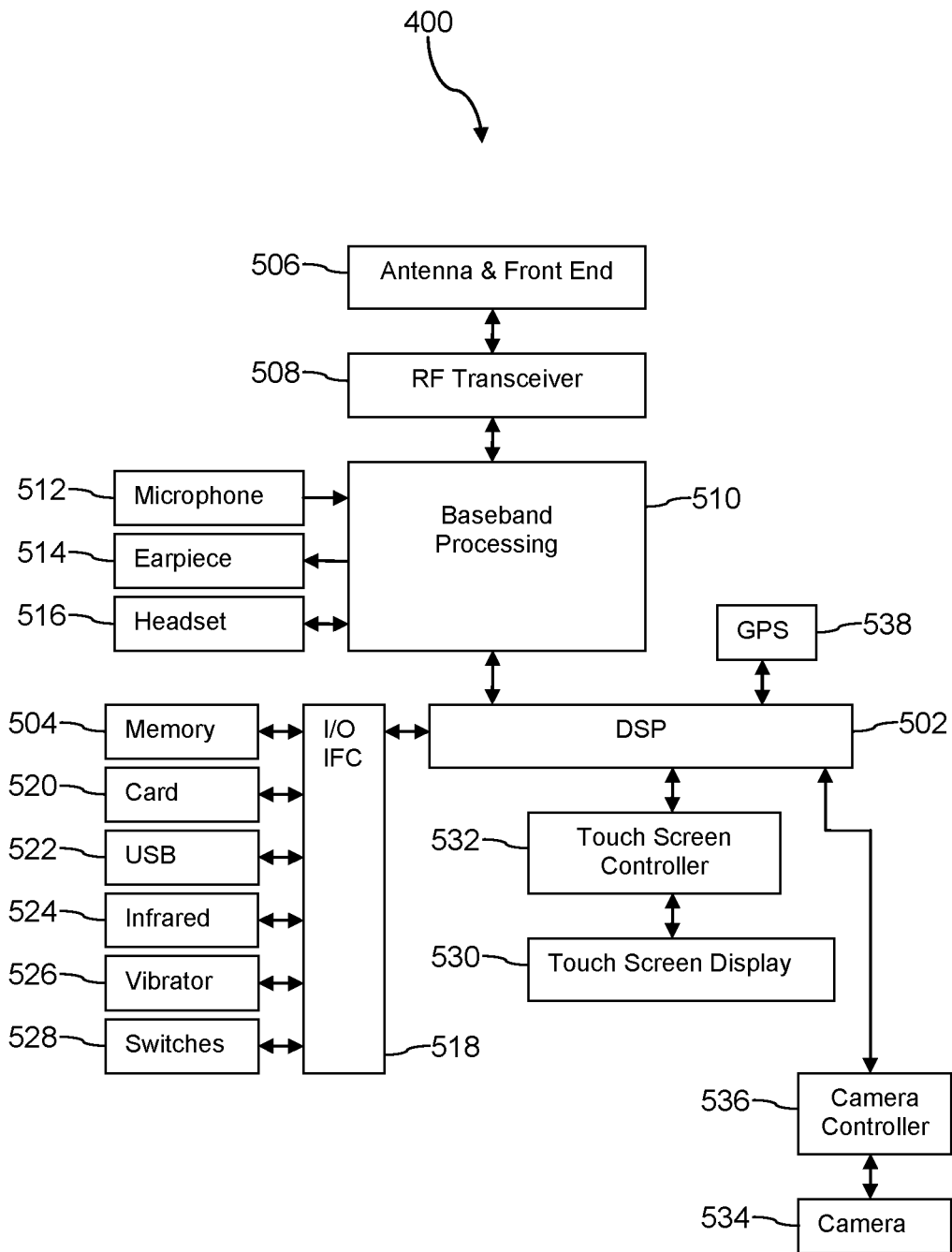
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
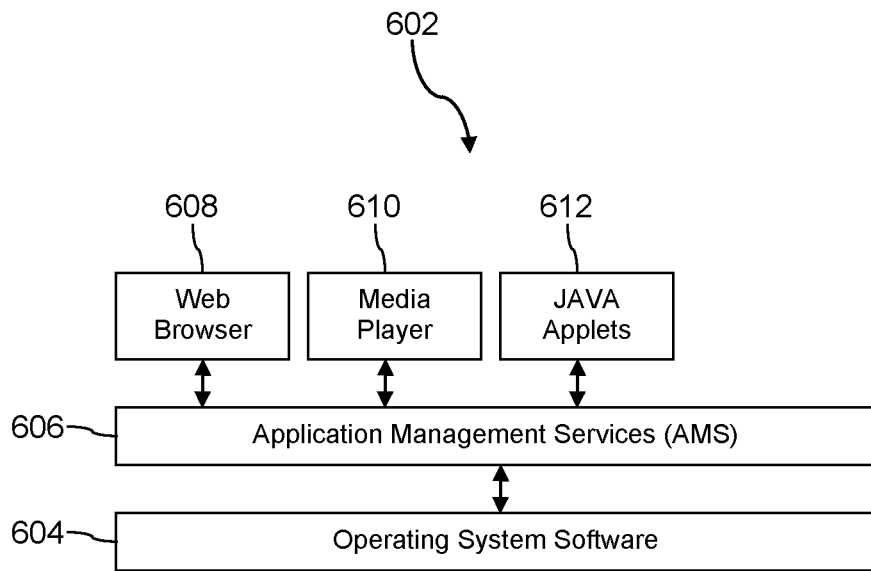
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
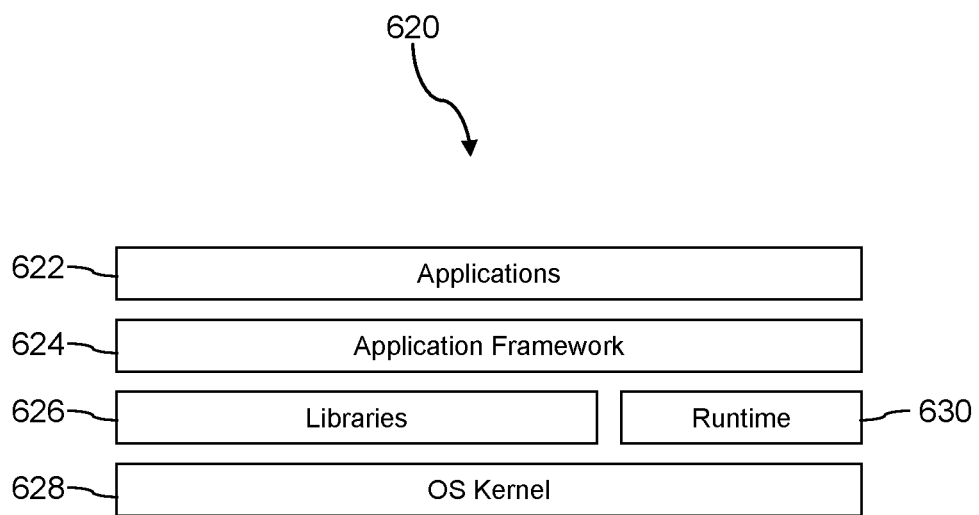
FIG. 7B is a block diagram of another software architecture of a mobile communication device according to an embodiment of the disclosure

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
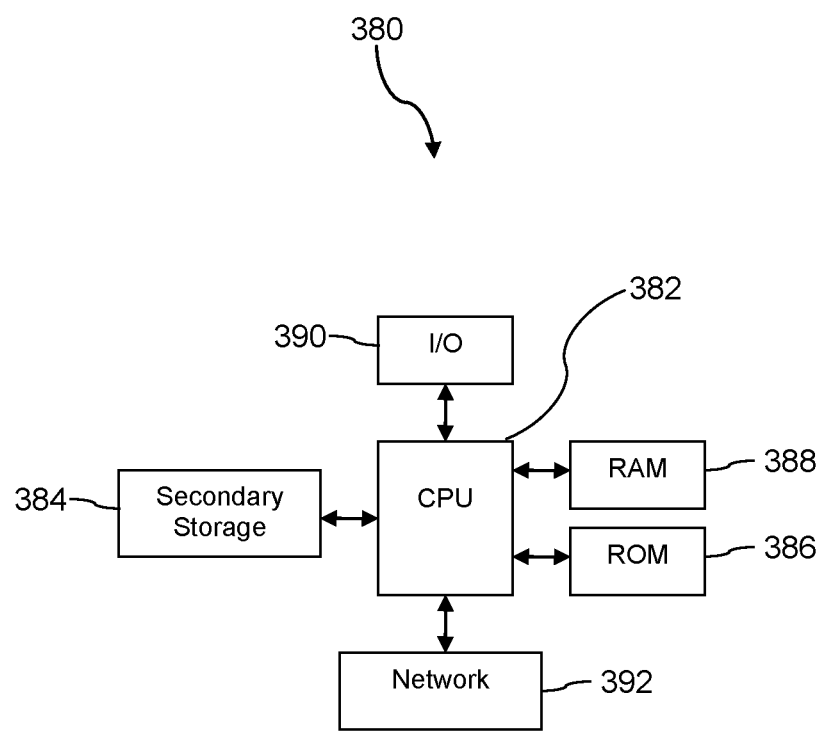
FIG. 8 is a block diagram of a computer system according to an embodiment of the disclosure.

FIG. 8 illustrates a computer system 380 suitable for implementing one or more embodiments disclosed herein, for example the OTA provisioning system 108 and HSS 130. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
a processor;
a subscriber identity module (SIM) card provisioned with a first profile for operation by the UE on the first wireless network, the first profile including files and directories and pointers pointing to the files that authorize and authenticate the UE on the first wireless network, wherein the UE initially operates on the first wireless network via the first profile; and
a wireless transceiver configured to receive a second profile related to operation of the UE on a second wireless network, the second profile provisioned to the SIM card of the UE, the second profile including new issuer security domain and application dedicated files added to existing issuer security domain and file structure on the SIM card, wherein provisioning the second profile changes the pointers in the first profile to point to files in the second profile that authorize and authenticate the UE on the second wireless network, wherein, upon reboot, the UE instantiates, via the pointers, the second profile, wherein in response to the instantiation, the UE operates on the second wireless network via the second profile, and wherein, other than the changed pointers, the files and directories comprising the first profile remain substantially unchanged stored on the SIM card after provisioning the second profile to the SIM card of the UE.

2. The UE of claim 1, wherein the second profile is provisioned to the SIM card of the UE using bearer independent protocol for provisioning the UE.

3. The UE of claim 1, wherein the SIM card is removable from the UE and has one of greater than 64 kb memory, 192 kb of memory or greater, or 256 kb of memory or greater, and wherein the second profile is stored on previously unused and undesignated space on the SIM card.

4. The UE of claim 1, wherein the second profile includes:
a first set of information provisioned to the UE, the first set of information including the new issuer security domain and application dedicated files for authorization and authentication of the UE on the second wireless network; and
a second set of information provisioned to the UE, wherein provisioning the second set of information includes changing the pointers in the first profile to point to the files in the second profile, and wherein the first set of information is provisioned to the UE one or more days before the second set of information is provisioned to the UE.

5. The UE of claim 4, wherein after the first set of information is provisioned to the UE, the first set of information is validated, wherein after validation, the second set of information is provisioned to the UE, and wherein the second set of information is validated before the UE is rebooted to instantiate the second profile.

6. The UE of claim 5, wherein when the validation of the second set of information fails, the UE changes the pointers in the first profile back to point to the files that authorize and authenticate the UE on the first wireless network.

7. The UE of claim 4, wherein before provisioning the second set of information, subscriber information of the UE is validated as having been updated on a home subscriber server associated with the second wireless network.

8. The UE of claim 4, wherein after the first set of information is provisioned to the UE, the first set of information is validated.

9. The UE of claim 8, wherein the validation comprises examining data structures of previously unused and undesignated storage space of the UE to which the first set of information was written according to the provisioning to verify that the first set of information was accurately written to the data structures.

10. The UE of claim 4, wherein provisioning the first set of information on the UE comprises adding the application dedicated files to existing application dedicated files associated with the first profile on the UE associated with the first network such that the existing application dedicated files remain unchanged stored on the UE.

11. A method for wireless provisioning, comprising:
operating a user equipment (UE) on a first wireless network via a first profile provisioned to a subscriber identity module (SIM) card, wherein the first profile includes files and directories and pointers pointing to the files that authorize and authenticate the UE on the first wireless network;
receiving, by a wireless transceiver of the UE, a second profile related to operation of the UE on a second wireless network;
provisioning the second profile to the SIM card of the UE, wherein the second profile includes new issuer security domain and application dedicated files added to existing issuer security domain and file structure on the SIM card, and wherein provisioning the second profile changes the pointers in the first profile to point to files in the second profile that authorize and authenticate the UE on the second wireless network; and
upon reboot, instantiating, by the UE, the second profile via the pointers;
in response to the insanitation, operating, by the UE on the second wireless network via the second profile, wherein, other than the changed pointers, the files and directories comprising the first profile remain substantially unchanged stored on the SIM card after provisioning the second profile to the SIM card of the UE.

12. The method of claim 11, wherein the second profile is provisioned to the SIM card of the UE using bearer independent protocol for provisioning the UE.

13. The method of claim 11, wherein the SIM card is removable from the UE and has one of greater than 64 kb memory, 192 kb of memory or greater, or 256 kb of memory or greater, and wherein the second profile is stored on previously unused and undesignated space on the SIM card.

14. The method of claim 11, wherein the second profile includes:
a first set of information provisioned to the UE, the first set of information including the new issuer security domain and application dedicated files for authorization and authentication of the UE on the second wireless network, and a second set of information provisioned to the UE, wherein provisioning the second set of information includes changing the pointers in the first profile to point to the files in the second profile, and wherein the first set of information is provisioned to the UE one or more days before the second set of information is provisioned to the UE.

15. The method of claim 14, further comprising:
after the first set of information is provisioned to the UE, validating the first set of information, wherein the second set of information is provisioned to the UE after the validation of the first set of information; and
validating the second set of information before the UE is rebooted to instantiate the second profile.

16. The method of claim 15, further comprising changing, by the UE, the pointers in the first profile to point back to the files of the first profile that authorize and authenticate the UE on the first wireless network in response to the validation of the second set of information failing.

17. The method of claim 14, further comprising validating that subscriber information of the UE has been updated on a home subscriber server associated with the second wireless network before provisioning the second set of information.

18. The method of claim 14, further comprising validating the first set of information after the first set of information is provisioned to the UE.

19. The method of claim 18, wherein the validation comprises examining data structures of previously unused and undesignated storage space of the UE to which the first set of information was written according to the provisioning to verify that the first set of information was accurately written to the data structures.

20. The method of claim 14, wherein provisioning the first set of information on the UE comprises adding the application dedicated files to existing application dedicated files associated with the first profile on the UE associated with the first network such that the existing application dedicated files remain unchanged stored on the UE.

* * * * *